United States Patent [19]

Bakker

[11] 4,453,292
[45] Jun. 12, 1984

[54] CORD LOCK

[75] Inventor: John A. Bakker, Bartlett, Ill.

[73] Assignee: Illinois Tool Works Inc., Chicago, Ill.

[21] Appl. No.: 412,429

[22] Filed: Aug. 30, 1982

[51] Int. Cl.³ ............................................. F16G 11/00
[52] U.S. Cl. ................................................... 24/115 G
[58] Field of Search .......................... 24/115 G, 136 R;
339/254 R; 248/188.5

[56] References Cited

U.S. PATENT DOCUMENTS

| 3,145,965 | 8/1964 | Stein | 248/188.5 |
| 3,329,391 | 7/1967 | Deane | 24/115 G |
| 3,604,069 | 9/1971 | Jensen | 24/115 G |
| 4,118,838 | 10/1978 | Schiefer et al. | 24/115 G |
| 4,288,891 | 9/1981 | Boden | 24/115 G |
| 4,328,605 | 5/1982 | Hutchison et al. | 24/136 R |

FOREIGN PATENT DOCUMENTS 719899 4/1942 Fed. Rep. of Germany ... 24/115 G

Primary Examiner—F. Barry Shay
Attorney, Agent, or Firm—Thomas W. Buckman; John P. O'Brien; Jack R. Halvorsen

[57] ABSTRACT

A cord lock is provided for securing or locking a flexible cord or the like. The cord lock has but three pieces, a molded plastic cylinder and a molded plastic piston, and a biasing spring trapped therebetween. Snap-over cammed retaining means are provided for holding the piston and cylinder in assembled relation against the biasing force of the spring. Confronting flats are provided on the outer surface of the piston and inner surfaces of the cylinder to maintain rotational alignment so that a pair of lateral apertures in the cylinder can be aligned with a cross-bore in the piston for movement of a cord or the like therethrough.

3 Claims, 4 Drawing Figures

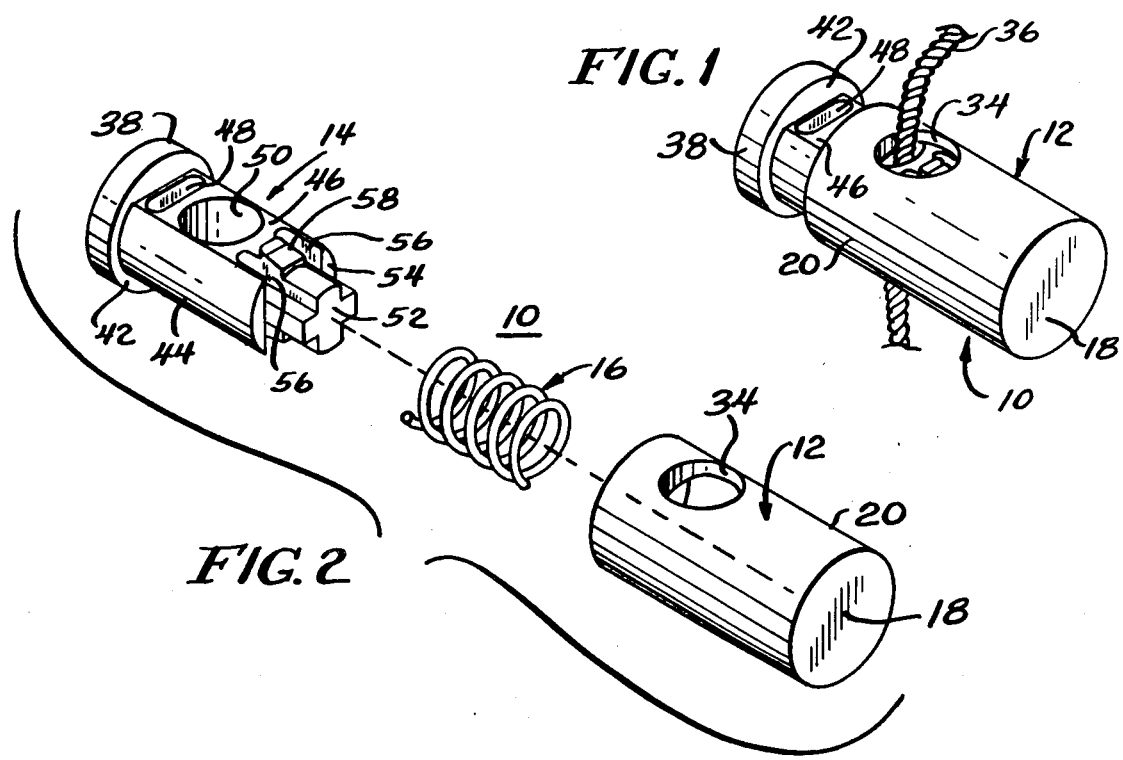
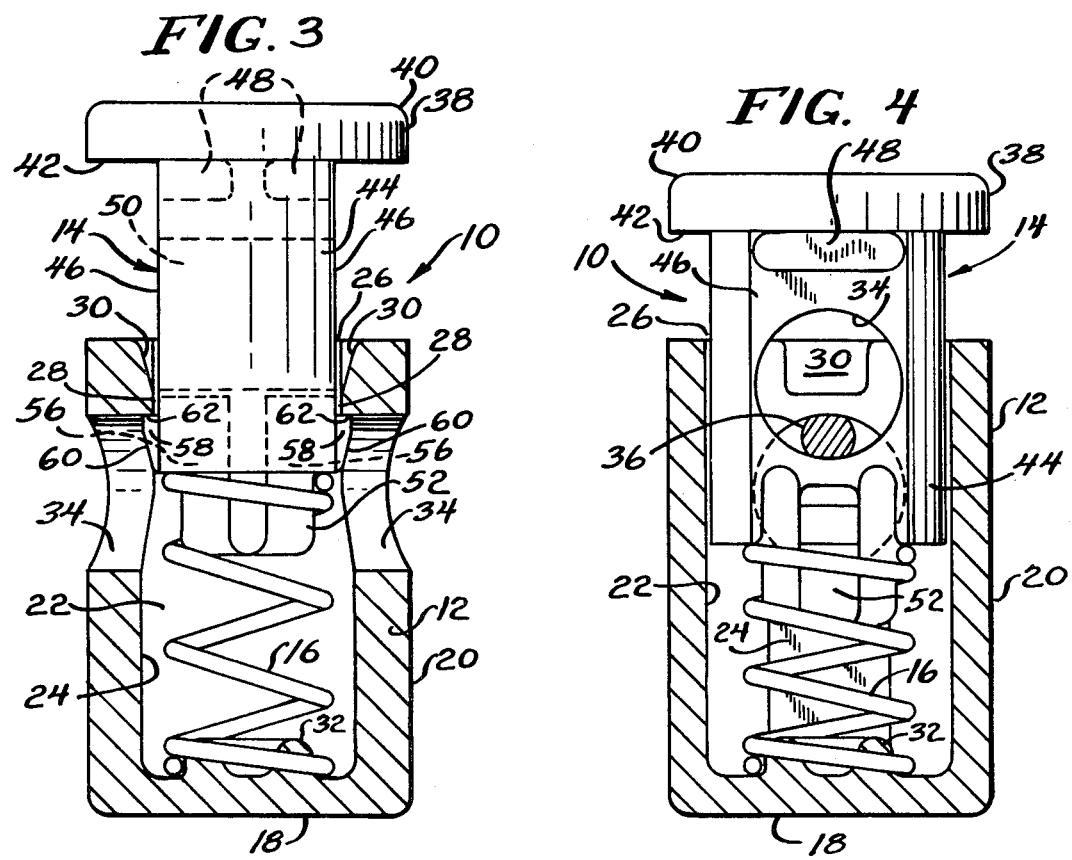

CORD LOCK

BACKGROUND OF THE INVENTION

There is a need in various fields of endeavor for providing an adjustable termination to a cord or the like. Cord locks have been developed for this purpose which include telescoping cylinders having lateral apertures urged apart by a spring. The cylinders are manually urged toward one another against the force of the biasing spring to align the apertures, whereby the cord, which is smaller than the apertures, can be freely drawn through the lock, or conversely the lock may be moved along the cord. When the cylinders are released the spring causes opposing edges of the apertures in the cylinders to clamp the cord.

Such cord locks initially were made of metal, and presented many disadvantages. Cord locks are often used in camping, backpacking, adjustment of parkas, and in aquatic operations. Thus, there is a considerable tendency toward corrosion and eventually inoperativeness of metal cord locks. Furthermore, such metal cord locks present sharp edges which tend to cut through the cord. In addition, there is nothing but the cord holding the parts together against the action of the spring, and if the cord is cut through, or if it is pulled entirely through the cord lock the parts may separate rather rapidly.

A step in the right direction is taken in the recently issued patent to Hutchison et al. U.S. Pat. No. 4,328,605 wherein the parts, except for the spring, are made of plastic, thereby minimizing problems of corrosion and improving the situation as to cutting through of the cord or the like. In that patent means also is provided for rotational alignment of the parts which generally was not possible with the prior art metal cord locks. However, it was still found necessary to utilize a four-piece (including the spring) construction with the end of one of the cylinders being frictionally held in place augmented by sonic or solvent welding, or cementing. This end piece, being initially separate, requires a discrete part to be handled during assembly, and leaves the possibility of inadvertent separation while in use.

OBJECTS AND SUMMARY OF THE PRESENT INVENTION

It is an object of the present invention to provide a three-piece plastic cord lock.

It is a further object of this invention to provide superior means for rotationally aligning the two movable parts of my new cord lock.

It is a further object of this invention to provide superior spring seats in a plastic cord lock.

It is further an object of this invention to provide a cord lock which greatly extends the life of a cord on which it is placed.

In achieving the foregoing and other objects of the present invention I have provided a three-piece cord lock which comprises only two molded plastic pieces and a contained biasing spring. The outer piece is a cylinder having internal flats on the otherwise cylindrical wall, while the inner member or piston is an essentially solid plastic member providing internal centering means for the biasing spring. Cord clamping surfaces of unprecedented widths are provided, thus minimizing wear and tear on the cord. The interfitting of the two plastic parts is such that they can be snapped together by axial movement during assembly and are thereafter locked against separation.

THE DRAWINGS

The present invention will best be understood from the following specification when taken in connection with the accompanying drawings wherein:

FIG. 1 comprises a perspective view of a cord lock constructed in accordance with the principles of the present invention;

FIG. 2 is an exploded perspective view of the cord lock of FIG. 1;

FIG. 3 is an axial sectional view through the cord lock; and

FIG. 4 is an axial sectional view taken at right angles to FIG. 3.

DETAILED DESCRIPTION OF THE DISCLOSED EMBODIMENT

A cord lock 10 constructed in accordance with the present invention includes but three parts, a cylinder 12, a plunger or piston 14, and a helical compression biasing spring 16.

Both the cylinder 12 and the plunger or piston 14 are of molded plastic construction, the preferred material being "Delrin" an acetal copolymer. This material has great strength and high dimensional stability following curing. Furthermore, during curing it shrinks somewhat, and advantage is taken of this characteristic as will be pointed out hereinafter.

The cylinder 12 is for the most part a right circular cylinder closed at one end by an integral end wall 18. The outer surface of the cylinder 12 comprises a right circular cylinder 20, while the inner surface 22 also comprises a right circular cylinder throughout most of its length, but is provided with flat chordal surfaces 24 running from end-to-end on diametrically opposite sides. As a practical matter the internal diameter of the cylindrical wall 22 is slightly less as the open end of the cylinder 18 than at the closed end for molding purposes. However, adjacent the open end 26 of the cylinder the flats are spaced somewhat more closely together at 28 than they are adjacent the closed end 18. A male mold member may be withdrawn from the cylinder 12 in part due to the inherent resiliency of the plastic material. However, following withdrawal of the male mold member the surfaces 28 draw closer together due to the inherent tendency of the plastic material to shrink somewhat during curing. Ramps 30 are provided at the upper portions of the flats 24 of somewhat less lateral dimension than the flats. The purpose for these ramps will be understood shortly hereinafter.

The end wall 18 of the cylinder 12 is provided internally with an upstanding circular rib 32 spaced inwardly from the wall 22 and forming an interior spring position or locator for the spring 16 within which it fits as seen in FIGS. 3 and 4.

Diametrically opposed circular apertures 34 extend through the wall of the cylinder 12, and particularly through the flats 24 thereof. These apertures are substantially larger in diameter than the diameter of a cord 36 with which the chord lock of the present invention is to be used.

The plunger or piston 14 includes a flat, button-like head having a rounded upper periphery at 40, and a flat underside 42. A body 44 extends axially from under the head 38 and is of generally cylindrical construction with chordal flats 46 on diametrically opposite sides thereof for confrontation with the flats 24 on the inside of the cylinder 12. Recesses 48 are provided in the body on the flat sides thereof immediately underlying the head 38 to avoid having too large a mass of plastic in one area which might cause problems in molding or in setting or curing of the molded article. A bore 50 extends through the body 44 having an axis perpendicular to the flat faces 46 and positioned at a generally intermediate portion of the body. The bore is of the same diameter as the holes 34, and may be aligned or misaligned with said apertures or holes as will be brought out hereinafter.

A cruciform spring positioner 52 extends axially from the end 54 of the body 46 remote from the head 38. This cruciform shape fits fairly snugly within the spring 16, but presents less contact area, and hence less friction than would a solid cylinder. Lateral recesses 56 are provided extending inwardly from the flats 56 and upwardly from the bottom end 54 of the body to avoid a concentration of plastic material and attendant problems.

Intermediate the recesses 56 and on the body 44 extending from the flats are a pair of teeth 58 seen in FIGS. 1 and 3. Each such tooth has a shallow slope 60 on its lower outer portion and also has an upper shoulder 62.

In assembly of the cord lock as heretofore shown and described the spring 16 is placed in the cylinder 28, centered by the spring positioner 32. The piston is then inserted into the cylinder, being rotationally oriented by the coacting flats 46 and 24 of the piston and cylinder respectively. Precise manual alignment is not required, since if the flats are anywhere near alignment they will simply react against one another to produce relative rotation of the parts and proper rotational alignment. The teeth 58 cam over the ramps 30 and then snap into the apertures 34 to retain the piston in assembled relation with the cylinder. When the parts are first assembled the relative positions are as shown in FIG. 3. When it is desired to clamp a cord or the like, the head of the piston is engaged along with the opposite end 18 of the cylinder and axial pressure brings the bore 50 of the cylinder into alignment with the apertures 34, whereupon the cord lock and cord can be moved relatively to pass the cord through the lock as shown in FIGS. 1 and 4. Release of manual pressure on the ends of the cord lock allows the spring to move the piston outwardly of the cylinder to the position shown in FIGS. 1 and 4 where the cord is aggressively gripped.

It will be observed that the present cord lock is of remarkably simple construction, comprising only three pieces. Two flats are shown in the illustrative embodiment of the invention on each of the piston and cylinder, but it is apparent that one would suffice for obtaining rotational alignment which maintains the cylinder apertures and the body bore in alignment. The flats are superior to prior art rib and groove structure in that snap-over assembly of the piston with the cylinder is effected thereby, and in that they provide a camming action to pull the cylinder and piston into axial alignment. Furthermore, with the cylinder aperture 34 provided in the flats there is a greater thickness of material, and hence less stress on the cord which is gripped.

With the essentially solid plunger as contrasted with prior art hollow plungers there is a greater clamp area, thus providing a wider grip and less wear on the cord. A better spring bearing is produced on the essentially solid body cylinder as contrasted with a hollow cylinder as used in the prior art in which the spring must bear against a narrow edge of the cylinder. Location of the spring from an interior position of either end thereof makes it possible to maintain the spring out of engagement with the inner surface of the cylinder which could caused undesired friction.

The specific example of the present invention as shown and described herein is for illustrative purposes only. Various changes in structure will no doubt occur to those skilled in the art, and will be understood as forming a part of the present invention insofar as they fall within the spirit and scope of the appended claims.

The invention is claimed as follows:

1. A cord lock having only three parts comprising an integrally molded one-piece cylinder of a resilient material having an open end and an integral closed end, said cylinder having a pair of aligned lateral apertures therein for receipt of a cord or the like, a piston axially movable in said cylinder and having a cross bore therein alignable with said apertures, said cylinder and said piston each having two diametrically spaced chordal flats for relative rotational alignment, wherein said lateral apertures and said piston cross bore extend through respective flats, a pair of lead-in lramps formed inwardly of said cylinder's open end on said cylinder's two diametrically spaced flats, a pair of teeth formed on said piston's two diametrically spaced flats adjacent the entering end of said piston, each of said teeth extending outwardly of said respective chordal flats and having a shallow slope on its lower outer portion and an upper shoulder facing away from said entering end, and a spring acting between said cylinder and said piston resiliently tending to move said piston out of said cylinder and to misalign said bore and said apertures to thereby clamp a cord between said cylinder and said piston, wherein said pair of teeth rides in said lead-in ramps as said piston is assembled into said cylinder by being moved axially towards said closed end of said cylinder to cam over said lead-in ramp and said shoulders of said pair of teeth snap into the respective pair of aligned lateral apertures to maintain said cylinder and said piston in assembled relation.

2. A cord lock having only three parts comprising an integrally molded one-piece cylinder having an open end and an integral closed end, said cylinder having a pair of aligned lateral apertures therein for receipt of a cord or the like, a piston axially movable in said cylinder and having a cross bore therein alignable with said apertures for receipt of a cord when substantially aligned with said apertures, and a spring acting between said cylinder and said piston resiliently tending to move said piston out of said cylinder and to misalign said bore and said apertures to clamp a cord between said cylinder and said piston, and snap-over retaining means on said cylinder and said piston for axially assembling said cylinder and said piston and for thereafter holding said cylinder and said piston in assembled relation, each of said cylinder and said piston being a cylinder and having a chordal flat thereon providing for relative rotational alignment, said snap-over retaining means including ramp means and retaining shoulder means, and two teeth disposed on two diametrically spaced chordal flats, at least one tooth of said teeth extending outwardly from its chordal flat adjacent the entering end of said piston, said at least one tooth having a shallow slope on its lower outer portion and an upper shoulder facing away from said entering end, said shoulder adapted to engage the margin of one of said lateral apertures to maintain said cylinder and said piston in assembled relation, said piston includes a head at its end remote from the entering end and a cruciform spring positioner extending axially a predetermined distance from said entering end, said spring positioner being snugly fitted within said spring and rib means on the interior wall of said closed end extending into the interior of said spring, said cross-bore and said lateral apertures being axially spaced a predetermined distance from the entering end of said piston and said cylinder closed end, respectively, whereby when said spring positioner and said rib means are in contacting juxtaposition the bore and apertures are aligned.

3. A cord lock as set forth in claim 1 wherein said head and the open end of said cylinder are spaced a second predetermined distance from said bore and said apertures whereby when said head and said open end are in contact said bore and apertures are aligned for accepting elongated articles.

* * * * *